United States Patent [19]

Shoner

[11] Patent Number: 5,080,737
[45] Date of Patent: Jan. 14, 1992

[54] METHOD OF FILLING A TIRE WITH A COMPOSITE-FOAM INSERT

[76] Inventor: Douglas J. Shoner, 12244 Truro Ave., Hawthorne, Calif. 90250

[21] Appl. No.: 680,402

[22] Filed: Apr. 4, 1991

Related U.S. Application Data

[60] Division of Ser. No. 423,587, Oct. 17, 1989, Pat. No. 5,031,679, which is a continuation-in-part of Ser. No. 50,495, May 13, 1987, abandoned, which is a continuation-in-part of Ser. No. 822,326, Jan. 27, 1986, abandoned, which is a continuation-in-part of Ser. No. 709,504, Mar. 8, 1985, abandoned.

[51] Int. Cl.$^5$ ............... B29C 67/18; B29L 30/00
[52] U.S. Cl. ................... 156/113; 156/112; 264/109; 264/126; 264/503
[58] Field of Search ............ 156/110.1, 112, 113, 156/245; 264/126, 109, 503; 152/310–314, 157, 316, 317, 336.1; 428/313.3, 313.5

[56] References Cited

U.S. PATENT DOCUMENTS

| | | |
|---|---|---|
| 11,504 | 7/1815 | Wolken . |
| 488,061 | 12/1892 | Bunker ............................ 152/317 |
| 584,498 | 6/1897 | Ettinger . |
| 526,873 | 9/1940 | Firestone Corp. . |
| 644,576 | 3/1900 | Brady ............................ 152/317 |
| 852,130 | 4/1907 | Magowan ....................... 156/112 X |
| 864,926 | 9/1907 | Schoonmaker .................. 152/317 |
| 1,152,779 | 9/1915 | Behm et al. .................... 152/317 |
| 1,310,113 | 7/1919 | Culmer ........................... 152/317 |
| 1,313,749 | 8/1919 | Small .............................. 152/317 |
| 1,332,953 | 3/1920 | Richards ......................... 152/317 |
| 1,373,111 | 3/1921 | Young ............................ 152/336.1 |
| 1,390,467 | 9/1921 | Smith . |
| 1,396,170 | 11/1921 | Emeno ............................ 152/317 |
| 1,415,140 | 5/1922 | Beckman ........................ 152/317 |
| 1,449,588 | 3/1923 | Connolly ........................ 152/328 |
| 1,585,837 | 5/1926 | Eiker . |
| 1,643,848 | 9/1927 | Hibbert .......................... 156/113 |
| 1,666,234 | 4/1928 | Cullen ............................ 156/113 |
| 1,752,845 | 4/1930 | Hibbert .......................... 152/317 |
| 1,823,566 | 9/1931 | Maranville . |
| 1,862,693 | 6/1932 | Martin ............................ 152/317 |
| 2,069,586 | 2/1937 | Mars . |
| 2,273,283 | 2/1942 | Pfeiffer . |
| 2,444,150 | 6/1948 | Best . |
| 2,451,172 | 10/1948 | Nies . |
| 2,470,990 | 5/1949 | Kennedy . |
| 2,812,551 | 12/1957 | Chupa . |
| 2,838,798 | 6/1958 | Rekettye . |
| 2,902,072 | 9/1959 | Reuter . |
| 3,022,810 | 2/1962 | Lambe . |
| 3,256,123 | 6/1966 | Hart ............................... 156/113 X |
| 3,358,062 | 0/1967 | Lemelson . |
| 3,426,821 | 2/1969 | Boileau . |
| 3,866,652 | 2/1975 | Ahmad .......................... 152/317 |
| 4,003,419 | 1/1977 | Verdier . |
| 4,037,636 | 7/1977 | Hagenbohmer et al. . |
| 4,060,578 | 11/1977 | Kisbany . |
| 4,110,389 | 0/1978 | Geihler et al. . |
| 4,169,494 | 10/1979 | Kubica et al. ................. 152/310 |
| 4,248,811 | 2/1981 | Doyle et al. . |

FOREIGN PATENT DOCUMENTS

| | | | |
|---|---|---|---|
| 32665 | 4/1908 | Austria ........................... 152/317 |
| 2649057 | 5/1978 | Fed. Rep. of Germany . |
| 2719163 | 11/1978 | Fed. Rep. of Germany . |
| 3013367 | 10/1981 | Fed. Rep. of Germany . |
| 368582 | 12/1906 | France ........................... 152/336.1 |
| 1069112 | 7/1954 | France ........................... 264/109 |
| 1215492 | 4/1960 | France ........................... 152/317 |
| 501565 | 11/1954 | Italy .............................. 152/317 |
| 544235 | 7/1956 | Italy .............................. 152/317 |
| 551147 | 11/1956 | Italy .............................. 152/317 |

Primary Examiner—Michael W. Ball
Assistant Examiner—Adrienne C. Johnstone

[57] ABSTRACT

This invention is a method of filling a tire with a composite-foam to eliminate rapid deflation "blow-outs" and for all practical purposes, eliminate flats. The composite-foam tire filling is comprised of a multiplicity of preconstructed, hollow, pressurized, elastomeric, one-piece, seamless cells bonded together into a configuration whereby substantially all of the exterior cell wall surface of all cells in the composite-foam tire filling, is engaged with portions of exterior cell wall surfaces of surrounding cells. This composite-foam mass is placed inside a tire to provide the tire with a composite-foam filled interior.

9 Claims, 5 Drawing Sheets

METHOD OF FILLING A TIRE WITH A COMPOSITE-FOAM INSERT

This application is a division of continuation-in-part application Ser. No. 07/423,587, filed Oct. 17, 1989 now U.S. Pat. No. 5,031,679, granted July 16, 1991. Continuation-in-part application Ser. No. 07/423,587, is a continuation-in-part of application Ser. No. 07/050,495, filed May 13, 1987 now abandoned. Continuation-in-part application Ser. No. 07/050,495, is a continuation-in-part of application Ser. No. 06/822,326, filed Jan. 27, 1986 now abandoned. Continuation-in-part application Ser. No. 06/822,326 is a continuation-in-part of application Ser. No. 709,504, filed Mar. 8, 1985 now abandoned.

BACKGROUND OF THE INVENTION

1. Field of the Invention

This invention relates to the field of pneumatic type tires for vehicles such as automobiles, trucks, cycles, etc., and is more particularly directed to a method for filling a tire with a composite-cellular "foam" structure to provide a pneumatic tire with the ability to sustain punctures without resulting in a detrimental loss of compressed air from within the pneumatic tire.

2. Description of the Prior Art

The method of preconstructing hollow, flexible "cells" and subsequently installing them in some fashion in a tire has been known for a great number of years, as described in U.S. Pat. Nos. 3,866,652; 3,256,123; 1,862,693; 1,752,845; 1,643,848; 1,449,588; 1,415,140; 1,396,170; 1,373,111; 1,332,953; 1,310,113; 1,313,749; 1,152,779; 852,130; 864,926; 644,576; 488,061. Despite all these methods to flat-proof pneumatic tires, tires are still subject to flats and dangerous high speed blow-outs. The main reason the methods of the prior art have failed to provide a functional means of "flat-proofing" modern over-the-road pneumatic tires is because they do not contain the required volume of pressurized air and they are too heavy.

OBJECTS OF THE INVENTION

It is an object of the present invention to provide a method for filling a tire with a composite cellular foam structure to eliminate deflation of pneumatic tires when punctured while in use on a vehicle.

It is further an object of the present invention to provide a method for filling a tire with a composite cellular foam structure that fulfills the criteria for proper function of a pneumatic tire.

It is also an object of the present invention to provide a method for filling a tire with a composite cellular foam structure that will be free of the problems inherent with the prior art.

Further objects of the present invention will become apparent in the following detailed description, discussion and the appended claims, taken in conjunction with the drawings.

SUMMARY OF THE INVENTION

The present invention is a method of filling a tire with an integral cellular elastomeric composite-foam structure.

The method of filling a tire with the composite-foam of the present invention begins by first preconstructing elastomeric, one-piece, seamless, hollow pressurized cells in the shape of spheres. The spherical, one-piece, seamless cells are individual structures, with each cell having its own complete, independent, cell wall. A multiplicity of these pressurized spherical cells are then covered with a thin coating of a fluid resin and placed in a mold. These coated cells are then transformed from a relation whereby the spherical cells are just touching each other on tangent points, to a configuration whereby substantially all of the exterior surface of all cells is engaged with portions of exterior cell wall surfaces of surrounding cells. The mold is then heated, if required, until the thin coating on the cells has cured, converting the multiplicity of independent cells into a single mass with the cells now permanently remaining in the engaged configuration resulting in substantially no remaining void space or excessive material between the cells. This mass is an independent, integral cellular elastomeric composite structure, liberally referred to as a flexible, pressurized, closed cell, "syntactic" or composite "foam". This molded cellular mass is then placed in a tire to thereby fill the tire with a cellular composite-foam.

Other aspects and advantages of this invention will become apparent from the following detailed description, discussion and the appended claims taken in conjunction with the drawings.

REFERENCE NUMERALS IN DRAWINGS

| REFERENCE NUMERALS IN DRAWINGS |
| --- |
| 10 Frame |

-continued

| REFERENCE NUMERALS IN DRAWINGS | |
|---|---|
| 10A | Frame Leg |
| 10B | Frame Leg |
| 12 | U-Shaped Bracket |
| 12A | Bracket Leg |
| 12B | Bracket Leg |
| 12C | Bracket Leg |
| 14A | Stationary Shaft |
| 14B | Bearing |
| 16A | Rotational shaft |
| 16B | Bearing |
| 18 | Motor |
| 20 | V-Belt |
| 22A | V-Belt Pulley |
| 22B | V-Belt Pulley |
| 24 | Cell Mold |
| 24A | Female End Of Cell Mold |
| 24B | Male End Of Cell Mold |
| 24C | Cell Mold Cavity |
| 24D | Passageway |
| 24E | O-Ring |
| 26 | Cell Mold Drive Shaft |
| 28 | Cell Mold Bearing |
| 30 | Cell Mold Shaft |
| 32 | Gas Valve |
| 34A | Stationary Miter Gear |
| 34B | Rotatable Miter Gear |
| 36 | Miter Gear Bearing |
| 38 | Rotatable Miter Gear Shaft |
| 40 | V-Belt |
| 42 | V-Belt Pulley |
| 44 | Additional Cell Mold |
| 46 | Top Mold Bracket |
| 47A | Fastening Bolt |
| 47B | Fastening Bolt |
| 48 | Cell Mold Bearing |
| 48A | Cell Mold Bearing |
| 50 | Pressurized Hollow Cell |
| 52 | Cell Wall |
| 54 | Hollow Interior Of Cell |
| 55 | Inside Diameter |
| 56 | Pressurized Gas |
| 57 | Void Space Between Cells |
| 58 | Flexible Fibers |
| 60 | Fluid Coating |
| 70 | Mold |
| 71 | Pin |
| 72 | End Cap |
| 73 | Pin |
| 74 | Mold Flange |
| 76 | Interior Mold Chamber |
| 80 | Extension Housing |
| 82 | Extension Housing Flange |
| 84 | Interior Housing Chamber |
| 86 | Follower Plate |
| 88 | Ram-Rod |
| 120 | Large Cells |
| 130 | Smaller Cells |
| 140 | Mold |
| 160 | Two-Piece "Split" Wheel Rim |
| 162 | Pneumatic Type Tire |
| 164 | Composite-Foam Tire Filling |
| 180 | One-Piece Wheel Rim |
| 182 | Pneumatic Type Tire |
| 184 | Tire Sidewall |
| 186 | Tire Tread |
| 188 | Pneumatic "Inner Tube" |
| 190 | Composite-Foam Tire Filling in "Liner" Configuration |
| 200 | Tangent Point |

DETAILED DESCRIPTION OF THE INVENTION

Method of Constructing the Cells of the Present Invention

Figure 1:
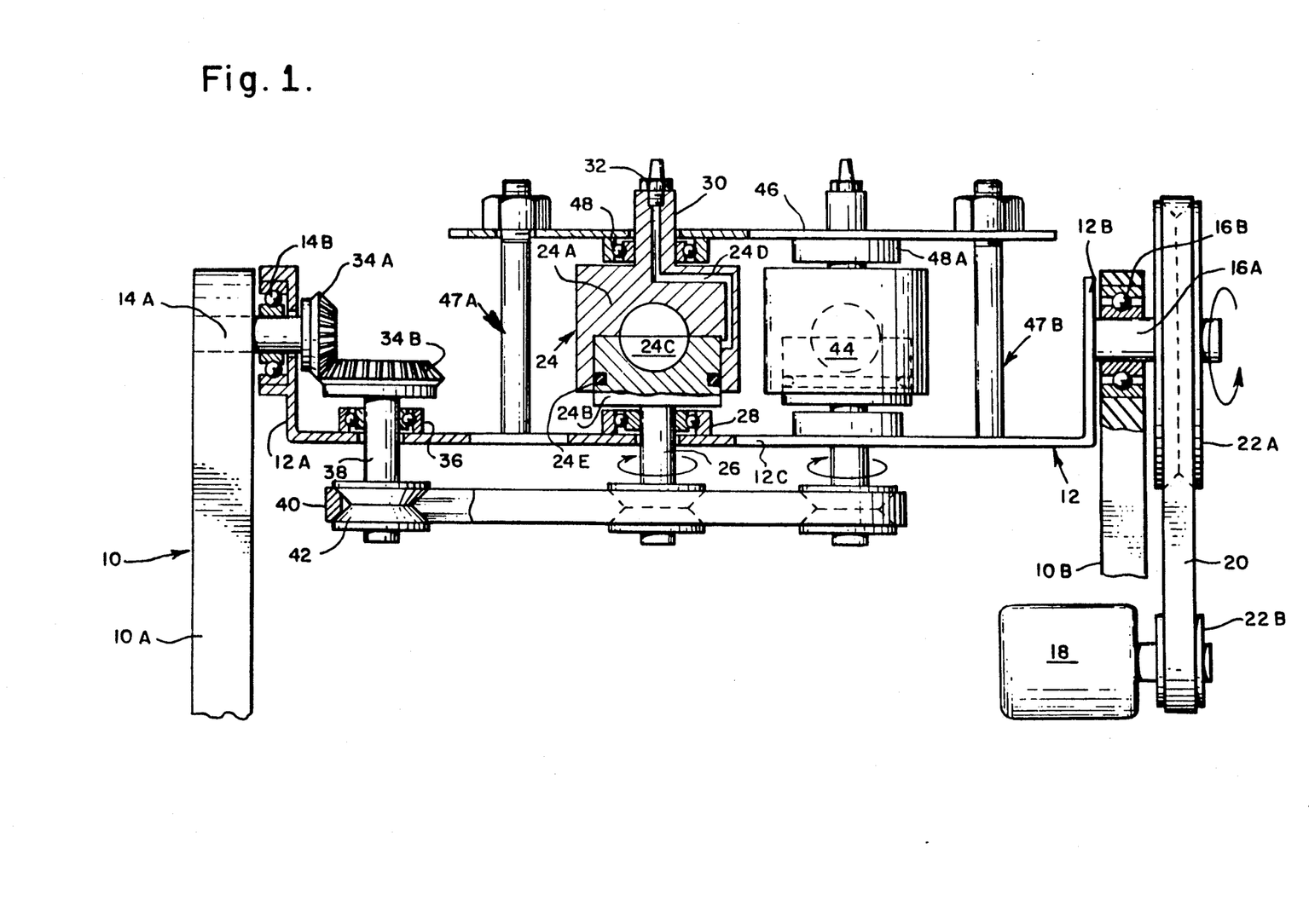
FIG. 1 is a diagrammatic view in partial cross-section of an apparatus for making the spherical cells of the present invention.

An apparatus for producing the cells of the present invention is shown in FIG. 1. A frame 10 is provided having a first upstanding leg 10a and a second upstanding leg 10b. A rotatable U-shaped bracket 12 is provided between the upstanding frame legs 10a and 10b. The U-shaped bracket has a first leg 12a parallel to and spaced away from the first upstanding frame leg 10a, a second leg 12b parallel to and spaced away from the second upstanding frame leg 10b, and a horizontal leg 12c connecting the first and second bracket legs.

A first shaft 14a passes through leg 10a of the frame and bracket 12a and a second shaft 16a passes through leg 10b of the frame. Shaft 16a is fastened to bracket leg 12b, and shaft 14a is fastened to frame leg 10a and bracket 12 is rotational within frame legs 10a and 10b by bearings 14b and 16b, to permit bracket 12 to be rotatable about the horizontal axis of shafts 14a and 16a.

Power to rotate shaft 16a and bracket 12, is provided by motor 18, in association with a V-belt 20 and V-belt pulleys 22a and 22b.

A cell mold 24 is rotatably attached to the horizontal bracket leg 12c and has a downwardly projecting shaft 26 which passes through mold bearing 28 and through horizontal leg 12c.

Cell mold 24 has a female end 24a, a cylindrical male end 24b, and a mold cavity 24c which forms a sphere when the female end and male end are mated. A passageway 24d is provided in female end 24a of mold 24 for communication with an external source of pressurized gas and within the tolerance between the male and female ends when engaged. An O-ring seal 24e is provided around the circumference of male end 24b to prevent the pressurized gas from escaping out around the circumference thereof when mated with the female end 24a.

The top of female end 24a of mold 24 is provided with a shaft 30 and a gas valve 32, to allow pressurized gas to be injected into mold cavity 24c without the release of gas out of mold 24 when the source of pressurized gas is removed.

Motor 18 is provided to rotate bracket 12 about the horizontal axis of shafts 14a and 16a, and thus rotate cell mold 24 about a horizontal axis. The power to simultaneously rotate cell mold 24 on a vertical/perpendicular axis is in the form of a stationary miter gear 34a mounted onto stationary shaft 14a, and engaged with a rotatable miter gear 34b rotatably mounted on said horizontal bracket leg 12c by bearing 36. The rotatable miter gear 34b has a shaft 38 downwardly extending therefrom for engagement with a V-belt pulley 42 and V-belt 40 which is also connected to mold shaft 26, through a V-belt pulley, to provide a source of energy for rotating mold 24 about its vertical/perpendicular axis.

In operation, cell mold 24 is opened and a predetermined amount of castable resin is placed in the semi-spherical mold cavity in the male end 24b of the mold. The preferred castable resin is a low viscosity multiple component polyurethane elastomer system. When the components are mixed together and cured, they produce a solid elastomeric material having a tensile strength ranging from approximately 2,000 to 8,000 pounds per square inch (psi.). However other resins found to be acceptable are also within the spirit and scope of the present invention. Castable elastomeric resins that are in liquid or a fine powder form, can be used with the cell casting technique of the present invention, with the liquid resins being preferred. Female mold end 24a is then mated to male end 24b until mold cavity 24c is sealed by O-ring 24e. Pressurized gas is then injected into passageway 24d through gas valve 32, pressurizing mold cavity 24c through a tolerance between mold ends 24a and 24b. When mold cavity 24c is pressurized to the desired pressure, mold ends 24a and 24b are drawn together. Motor 18 is then actuated to rotate shaft 16a by means of V-belt 20 and V-belt pulleys 22a and 22b. The rotational energy on shaft 16a causes bracket 12 to rotate about the horizontal axis of shafts 14a and 16a. When this rotation commences, the rotatable miter gear 34b rotates around the stationary miter gear 34a, causing miter gear shaft 38 to rotate causing V-belt pulley 42 and V-belt 40 to rotate causing mold shaft 26 to rotate causing mold 24 to rotate about the vertical/perpendicular axis of said mold. As a result, cell mold 24 will be rotated simultaneously about perpendicular axes causing the castable resin within mold cavity 24c to be distributed on the entire surface of mold cavity 24c. The rotational speed of shaft 16a, should be a speed as low as possible that will produce a substantially uniform cell wall thickness. Different size cells, different resin viscosities and different amounts of resin used to charge mold cavity 24c, may require the rotational speed of shaft 16a to be adjusted accordingly. The rotational speed of mold shaft 26 and therefore the rotational speed of mold 24 can be increased or decreased independent of the speed of shaft 16a by changing the ratios of miter gears 34a and 34b and or changing the diameter of pulley 42, to allow a desired speed to be achieved. The resin is cured while lining the entire surface of mold cavity 24c. Mold 24 may be heated in any suitable way to effectuate resin curing. When the resin has cured, mold 24 is opened and the cell produced in mold cavity 24c is removed. The cell produced in mold cavity 24c will have an independent, one-piece external surface and an independent, one-piece internal surface which defines a complete one-piece, seamless, independant cell wall therebetween and contains a pressurized gas in its hollow interior.

FIG. 1 illustrates a second cell mold 44 in parallel with mold 24. The second cell mold 44 is identical in construction and operation to cell mold 24. Additional cell molds may be provided along the length of horizontal bracket leg 12c to increase the production of cells. A top mold bracket 46 and bearings 48 and 48a are provided to stabilize the molds and to provide for their pressurization and rotation by being secured to bracket 12 by fastening bolts 47a and 47b.

Figure 2:
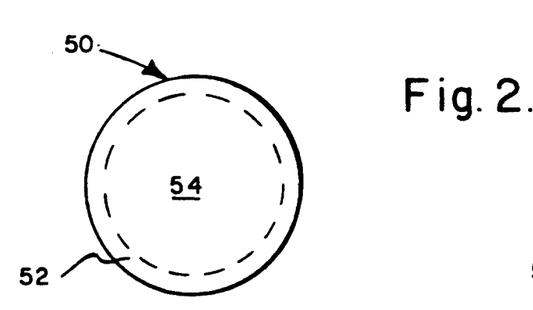
FIG. 2 is a frontal view of a spherical cell of the present invention.
Figure 3:
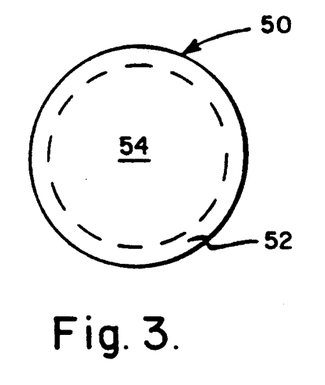
FIG. 3 is a side view of the cell shown in FIG. 2.
Figure 4:
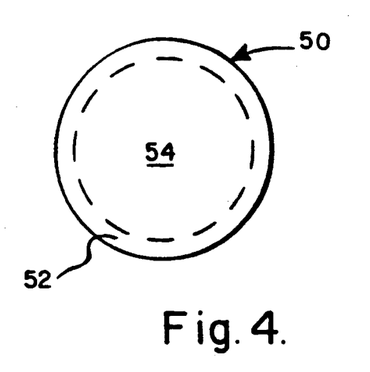
FIG. 4 is a top view of the cell shown in FIG. 2.

FIG. 2 is a head-on, frontal view of the one-piece, hollow cell of the present invention showing the cell 50, the cell wall 52 and the hollow interior 54. FIG. 3 is a side view of the same cell shown in FIG. 2. FIG. 4 is a top view of the same cell shown in FIG. 2. These engineering type views have been used to clearly show that regardless of how cell 50 of the present invention is viewed, a seam is not present.

Figure 5:
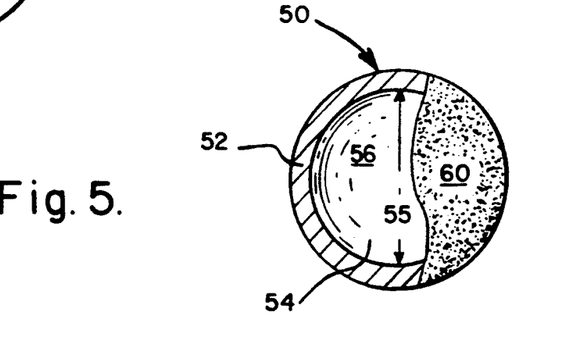
FIG. 5 is a view of the spherical cell of the present invention in partial cross-section and showing the thin fluid coating thereon.

FIG. 5 shows a view of cell 50 of the present invention in partial cross-section and showing the thin fluid coating 60 thereon. The cell wall 52 of cell 50 is made of a solid, high tensile strength, elastomeric material such as polyurethane, having a tensile strength ranging from approximately 2,000 to approximately 8,000 pounds per square inch (psi). The thickness of cell wall 52 can range from between approximately 0.001 of an inch to approximately 0.250 of an inch. The hollow interior 54 of cell 50 is filled with a pressurized gas 56 such as nitrogen or air. The exterior surface of cell wall 52 has a thin coating of a fluid resin 60, that when cured, will be a solid elastomeric substance which serves to provide the matrix for the composite cellular foam of the present invention. The weight of cell 50 can range from approximately 1 gram to approximately 30 grams. The inside diameter 55 of cell 50 can range from approximately 0.5 of an inch to approximately 2 inches. It is emphasized that these measurements are given for cells anticipated for use in automobile tires. The cell wall thickness, cell weight and cell inside diameter can be smaller or greater, depending upon the size of the tire and the use to which it is put. For example, the dimensions would be smaller for cells used in connection with bicycle tires and larger for earth-moving and mining vehicles.

Figure 6:
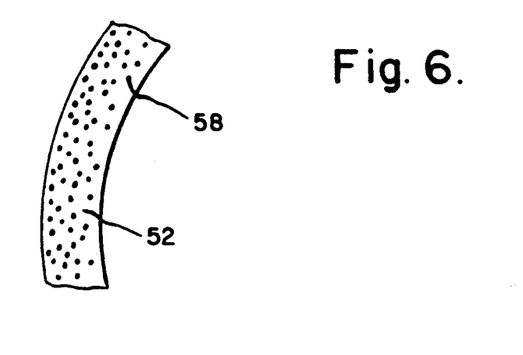
FIG. 6 is a greatly enlarged cross-sectional view of a section of a cell wall of the present invention which is reinforced with flexible fibers.

The strength of cell 50 may be increased by admixing with the resin prior to casting, suitable amounts of reinforcing fibers. FIG. 6 shows a greatly enlarged partial cross-sectional view of cell wall 52 that is reinforced with flexible fibers 58. The flexible reinforcing fibers 58 are mixed into the castable resin that is subsequently placed into mold cavity 24C. This results in the flexible fibers 58 being situated in cell wall 52 and evenly disbursed throughout cell wall 52.

The cells of the present invention are described in terms of seamless, one-piece, hollow, pressurized, elastomeric, spherical cells. While the spherical shape is preferred, the invention is not limited solely thereto, but contemplates the aforementioned cells being of any shape, which may, upon routine testing, be found to be suitable for use with the present invention.

METHOD OF FILLING A TIRE WITH THE COMPOSITE-FOAM OF THE PRESENT INVENTION

The preferred embodiment for filling a tire with the composite-foam of the present invention is shown in FIGS. 5, 7, 8, 9, 10, 11, 12, and 13. When elastomeric cells 50 are ready to be incorporated into the composite-foam of the present invention, cells 50 are thinly coated with fluid resin 60 which is preferably of the same composition used to manufacture elastomeric cells 50. The preferred cells 50 are the cells of the present invention who's method of construction is set forth above. However, the composite-foam of the present invention is not limited solely to the seamless-cells of the present invention. Other cells constructed by any means found to be acceptable, can be utilized and are within the spirit and scope of the present invention. The preferred coating resin 60 is a polyurethane that will produce a solid elastomer when cured, but other resins that produce solid elastomers when cured are also within the spirit and scope of the present invention.

Figures 7, 8:
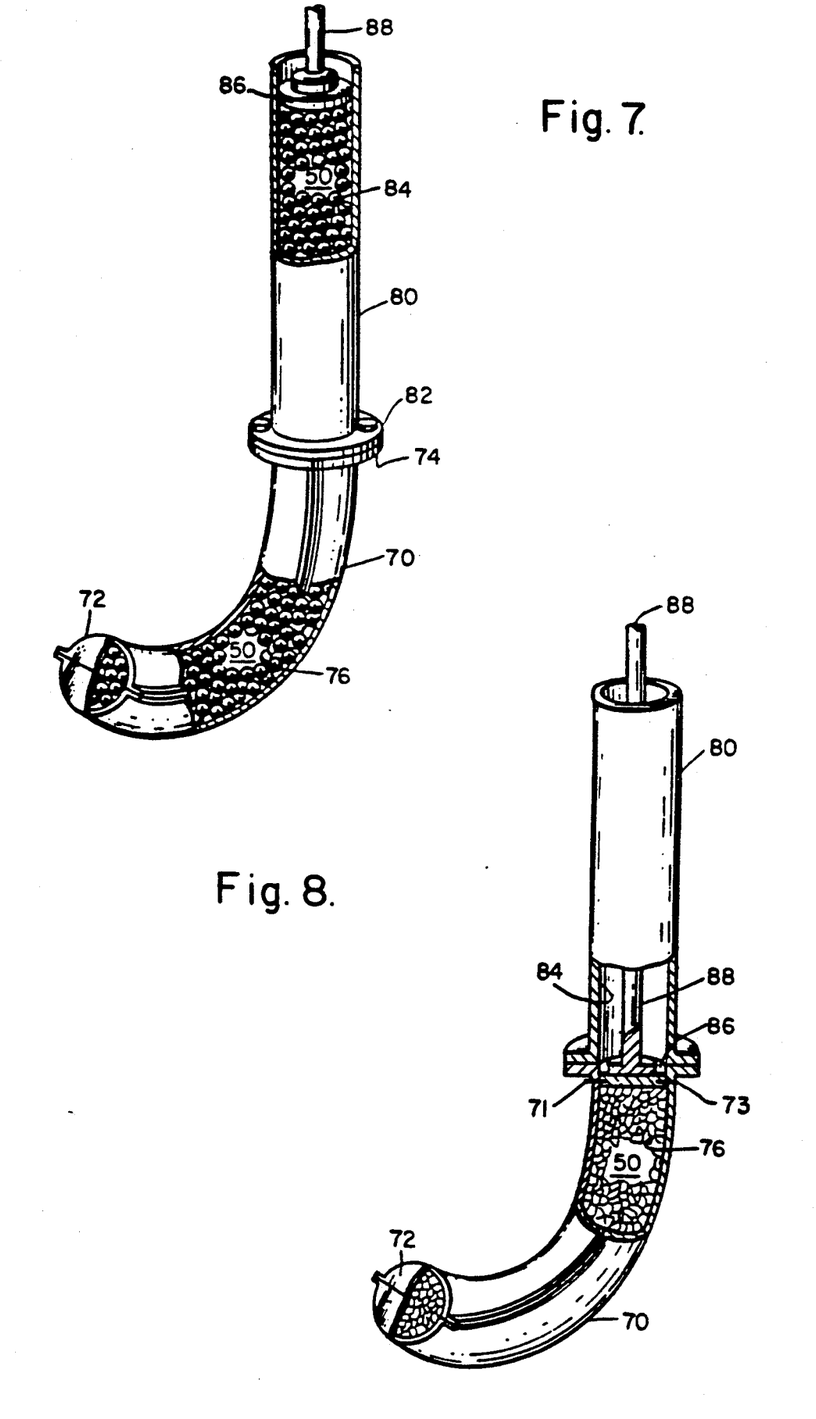
FIG. 7 is a representation in partial cross-section of a mold and extension housing with both filled with coated cells.
FIG. 8 is a representation in partial cross-section of a mold and extension housing showing the volume of cells in the extension housing combined with the volume of cells in the mold.

FIGS. 7 and 8 show a mold 70 in a desired section and in a desired shape to conform to the interior of the tire intended to be filled. Mold 70 is a quarter section of a tire. It will be appreciated that mold 70 can be in any desired section. Or rather than produce multiple sections, a single tire filling composite-foam "ring" could be produced. Mold 70 comprises an integral cap 72 at one end and a mating flange 74 at its other end. Mold 70 also comprises an interior mold chamber 76. Attached to mold 70 and in communication with interior mold chamber 76, is extension housing 80. Extension housing 80 comprises a mating flange 82 through which it is attached to mating flange 74 of mold 70. Extension housing 80 further comprises an internal chamber 84 which is in direct communication with interior mold chamber 76. When a multiplicity of elastomeric cells 50 are ready to be molded into the composite-foam of the present invention, they are coated with a thin layer of fluid resin 60. The cell coating 60 takes place prior to cells 50 being put into mold 70 and extension housing 80 by any suitable method. One suitable method is to place a multiplicity of cells 50 in a container, pour a predetermined amount of fluid resin onto cells 50 and stir or agitate the cells until coated. Coating cells 50 prior to filling into mold 70 and extension housing 80 is preferred, but coating 60 may be applied to cells 50 during filling into mold 70 and extension housing 80 by any method found to be suitable. As shown in FIG. 7 interior mold chamber 76 is completely filled with coated cells 50 and internal chamber 84 of extension housing 80 is also filled with a predetermined volume of coated cells 50. Thereafter, a follower plate 86, which is conformal to the internal profile of interior chamber 84 of extension housing 80, but is of reduced size so as to create a gap for allowing air to vent, is placed on top of cells 50 to close internal chamber 84. As shown in FIG. 8, a ram-rod 88 is used to push on follower plate 86 to move all the cells 50 in internal chamber 84 into interior mold chamber 76. Due to the spherical shape of cells 50 and fluid resin coating 60 thereon, cells 50 in internal chamber 84 smoothly combine with cells 50 in interior mold chamber 76. As a result of this combining together, the original shape of cells 50 is transformed causing substantially all of the external surface of cell wall 52 of cells 50 shown in FIG. 8 to be engaged with surrounding portions of external surfaces of cell walls 52 of surrounding cells 50.

Figure 9:
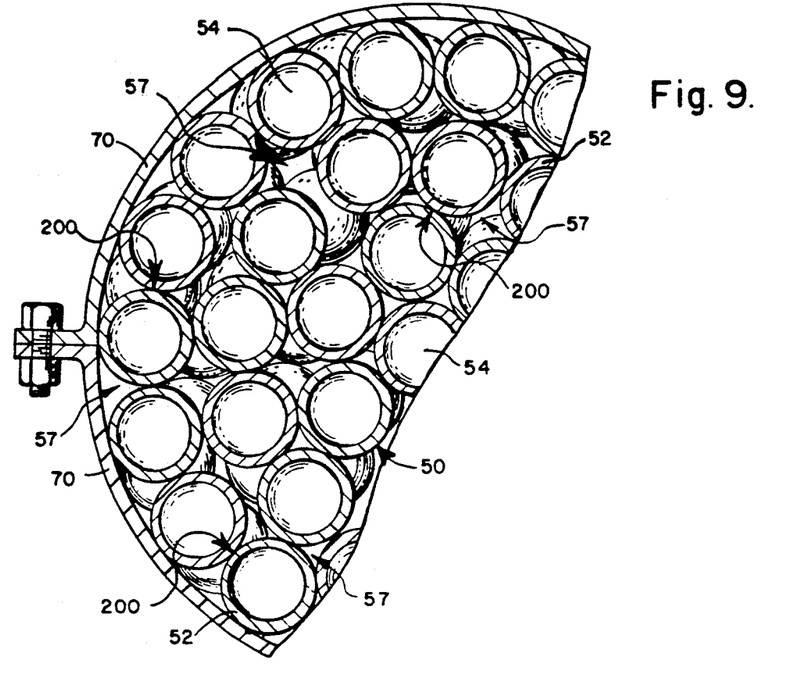
FIG. 9 is an enlarged partial cross-sectional view of FIG. 7 showing the cells in the mold.
Figure 10:
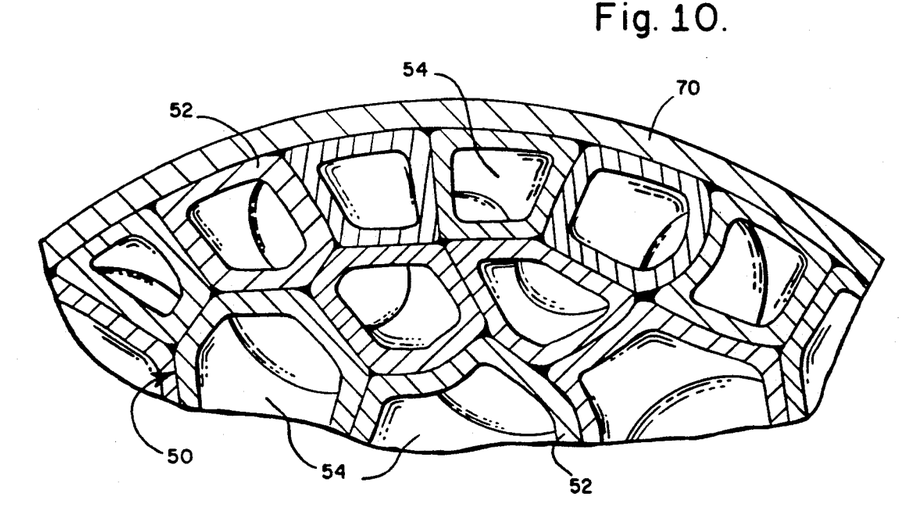
FIG. 10 is an enlarged partial cross-sectional view of FIG. 8 showing the cells in their final cellular embodiment.

This engagement of cells 50, is clearly illustrated in FIGS. 9 and 10. FIG. 9 is an enlarged partial cross-sectional view of mold 70 shown in FIG. 7, showing mold 70, cells 50, cell walls 52, cells hollow interior 54, void space 57 between cells 50 and tangent points 200. In the uncombined state shown in FIG. 9, cell walls 52 contact adjacent cells walls 52 only at tangent points 200, creating void spaces 57 between cells 50. As shown in FIG. 8, when cells 50 in extension housing 80 are combined with cells 50 in mold 70, the relation between cells 50 in mold 70 is transformed, as clearly shown in FIG. 10. FIG. 10 is a greatly enlarged partial cross-sectional view of mold 70 shown in FIG. 8. FIG. 10 shows that when these two volumes of cells 50 are combined, it transforms the relation of spherical cells 50 from just contacting adjacent spherical cells 50 on tangent points 200 in the uncombined state shown in FIG. 9, to a configuration that comprises substantially all of the total external cell wall surface 52 of all cells 50 in mold 70 shown in FIG. 8, is in engagement with a portion of the external cell wall surface 52 of adjacent surrounding cells 50.

It shall be appreciated that the aforesaid predetermined volume of cells 50 in internal chamber 84 of extension housing 80 shown in FIG. 7, shall be of sufficient amount, which is approximately the same volume of cells in mold 70, so that when combined with cells 50 in mold 70 shown in FIG. 8, substantially all of the external cell wall surface of all cells will be engaged with a portion of the external surface of surrounding cells, as shown in FIG. 10.

Figure 12:
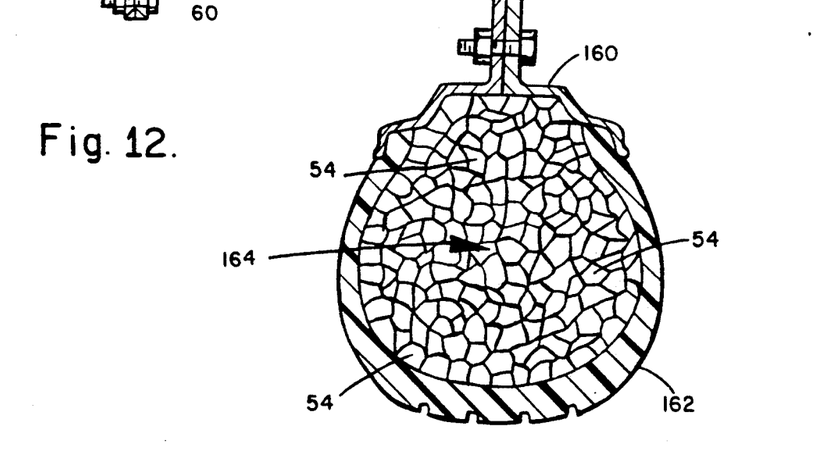
FIG. 12 is a partial cross-sectional view of a pneumatic tire filled with the composite-foam of the present invention.

Thereafter, as shown in FIG. 8, follower plate 86 is secured to mold 70 through pins 71 and 73 to thereby close mold chamber 76. Then, ram rod 88 and extension housing 80 are removed. The cells 50 in mold 70 shown in FIG. 8, are then bonded together while in the engaged state described above and shown in FIGS. 8 and 10 by resin coating 60 through heating, if required, mold 70 in an oven until coating 60 on cells 50 has cured, converting the multiplicity of independent, individual cells into a single, integral cellular elastomeric composite mass. Upon the curing of resin coating 60, mold 70 is opened to remove the composite-cellular foam tire filling of the present invention. When removed from mold 70, cells 50 comprised in the now finished composite-foam tire filling of the present invention, remain in the engaged state shown in FIG. 10. The appropriate number of finished composite-foam tire filling sections are placed in the interior of a tire to provide the final step in foam filling a tire in accordance with the present invention. FIG. 12 is the final step which shows in partial cross-section, a tire filled with the composite-foam tire filling of the present invention. In FIG. 12 there is shown the present invention composite-foam tire filling 164 and showing hollow cell interior 54, a tire 162 and two-piece wheel rim 160. The composite-foam filled tire shown in FIG. 12 is obtained by placing the finished, cured, composite-foam tire filling 164, into tire 162 thereby filling the interior of tire 162. Tire 162 filled with the present invention composite-foam 164 maybe mounted to a multi-piece "split" wheel rim 160 whose sections separate along a plane perpendicular to the rotational axis of the wheel.

When composite-foam tire filling 164 shown in FIG. 12 is punctured by a nail or other common road hazard, generally only a few cells will lose their volume of pressurized gas from hollow cell interior 54. But the lose of pressure from within these few cells is insignificant in view of the great number of cells comprising the composite-foam tire filling. Therefore tire 162 remains operable after being punctured.

Figure 13:
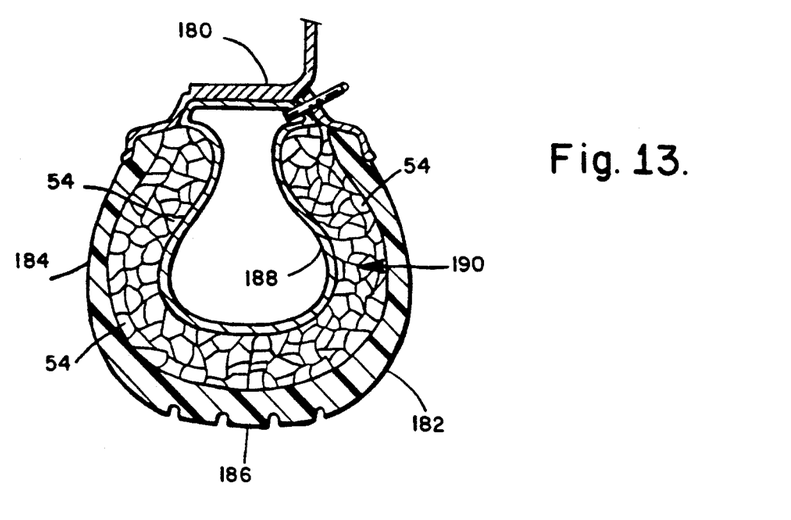
FIG. 13 is an alternative embodiment of the present invention showing a partial cross-sectional view of a pneumatic tire having a pressurized air chamber and filled with the composite-foam of the present invention.

FIG. 13 shows a tire filled with the composite-foam tire filling of the present invention for applications where punctures generally penetrate into the tire approximately 1 to 3 inches and or where eliminating the tire's conventional air chamber all together is not desirable. In FIG. 13 there is shown a one-piece, drop center wheel rim 180, a tire 182, tire tread 186, tire sidewall 184, pneumatic inner tube 188 and the composite-foam tire filling of the present invention 190 and showing hollow cell interior 54. When filling a tire for this application, the composite-foam tire filling of the present invention is manufactured in accordance with the method set forth above. The mold however is in a desired shape, so as to create a "lining" between the tire casing's inner surface, adjacent to tire tread 186 and sidewall 184, and inner tube 188. Composite-foam tire filling 190 may be bonded to the interior surface of tire 182 and to adjacent sections, if a multiplicity are used, by a suitable bonding material to create a hermetic seal and thus an air-tight chamber, to eliminate the need for inner tube 188.

Figure 11:
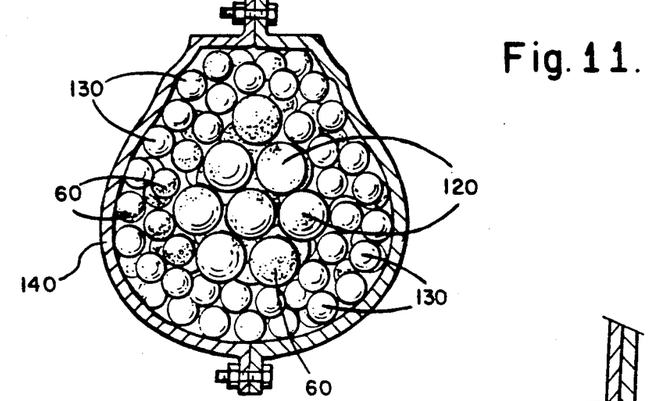
FIG. 11 is a cross-sectional view of an alternative embodiment of the present invention showing large cells in the center of the mold and small cells surrounding the large cells.

A method by which the weight of the composite-foam tire filling of the present invention may be tailored for a specific application while maintaining a high degree of "flat-proof" capability is to use two different cell sizes. A cross-sectional view of this alternative embodiment is shown in FIG. 11. This view shows cells 120 and 130 in mold 140 prior to being engaged, which is comparable to the view shown in FIGS. 7 and 9. This view is shown this way in order to more clearly illustrate the configurations of the different size cells. The larger cells 120 are located toward the center of mold 140 and smaller cells 130 are located closer to the interior surface and around the perimeter of mold 140. Therefore, when using cells of differing size, the cells of smaller size 130 are arranged in mold 140 so they will be closer to the tire tread and sidewalls than larger size cells 120 and larger cells 120 will thus be further away from the tire tread and sidewalls and will be closer to the center of the tire than smaller cells 130.

The exterior surface of the composite-foam tire filling of the present invention may be coated or impregnated with a gas barrier material such as polyvinyl alcohol, butyl rubber, or polyisobutylene to prevent or reduce gas migration out of the cells. Other gas barrier material suitable for use with the present invention and determined by routine experimentation, may also be used. Polyvinyl alcohol, polybutyl rubber or polyisobutylene are examples of resins which may be used for the gas barrier coating.

SUMMARY OF ADVANTAGES

The advantages of my method of filling a tire with composite-foam become apparent over the prior art. Some of these advantages are: because the hollow pressurized cells are constructed in their entirety in one casting operation, the cell wall is one continuous, uninterrupted structure. To further describe this structural characteristic of the cells, the entire external surface and the entire internal surface and the entire interval therebetween, is a single, one-piece structure, completely enclosing a single hollow center, and is not composed of pieces, segments or units joined together to form a complete hollow cell. This feature significantly reduces weight. The cells of my invention do not require an additional manufacturing operation of hermetically sealing segments together to form a sealed, hollow cell. Therefore the wall thickness of the cell can be drastically reduced and as a consequence, the weight of the cell is reduced. The reduced weight of each cell accumulates into a substantial overall weight savings in the resulting composite-foam, in view of the large number of cells comprised in the composite-foam. As a result, this substantially reduces the weight of my tire filling and therefore the unsprung weight of the tire and wheel rim assembly. In addition to the weight saving benefit, the one-piece, seamless feature of the cells of my invention eliminates problems of the pressurized gas within the cell from leaking through a seam, and also provides a substantially stronger structure because it does not have a seam line that may rupture. Additionally, another feature of the cells of my invention is that the entire pressurized hollow cell is constructed completely in one casting operation. This eliminates the prior art's subsequent manufacturing operations of hermetically joining and sealing multiple cell pieces into a hollow pressurized cell and makes possible a commercially viable means of mass producing hollow, elastomeric, pressurized cells for composite-foam tire fillings.

Because the cells of my composite-foam are in a state that has substantially all of the exterior cell wall surface of all cells engaged with portions of surrounding exterior cell wall surfaces and the cells are bonded together in this state, the solid mass of material between the cells of the prior art, is substantially eliminated. This significantly reduces the weight of my composite-foam. A mass between cells that contact each other only at tangent points, quickly accumulates into a substantial volume. This volume of solid mass between the cells of the prior art, equals almost half of the total volume of their apparatuses. Because the cells are bonded together while in the engaged together state, my composite-foam tire filling does not require all the cells to remain pressurized to maintain cell engagement. Therefore punctures, i.e. depressurizing individual cells, does not result in the cells in the structure becoming "disengaged" from one another.

The weight of a "flat-proofing" foam is a critical factor. At 60 mph, a passenger car tire generates 160 g's of centrifugal force in the shoulders of the tire. Obviously at these high loads, a heavy apparatus placed inside a tire for flat-proofing will place a tremendous, possibly detrimental, load on the tire structure. My composite-foam tire filling substantially reduces the load placed on the tire by centrifugal force. This is due to the substantially reduced amounts of material in the cell walls and between the preconstructed cells.

Another undesirable effect caused by weight that is well known is "self-aligning torque". This is a gyroscopic effect caused by the spinning of a heavy tire and wheel rim assembly, i.e. high unsprung weight, which causes the spinning wheel to resist steering inputs from the driver and thereby places additional stress on the steering system by making the automobile harder to steer. This is also a dangerous situation for two reasons. First, in panic situations, the car would be harder to handle. Second, the additional stress can wear out steering system components at an accelerated rate and can cause critical steering system components to fail. My method of foam filling a tire address the critical factor of weight of a "flat-proofing" apparatus inside the tire and thus these safety aspects. In addition to the safety aspect of eliminating high speed blow-outs.

In addition to its obvious flat-proof capabilities, the tire filling configuration shown in FIG. 13 has the feature of being able to regulate the pressure in a chamber that is located inside a tire and thus tire pressure. This chamber can also compensate for any pressure loss in the composite-foam liner due to gas migration by increasing the pressure in the chamber.

The principles, preferred embodiments and modes of operation of my invention have been described in the foregoing specification. My invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. The method of making a composite-foam filled tire, comprising the steps of:
   a. filling the interior of a mold with a multiplicity of individually preconstructed independent elastomeric cells that comprise an external surface and an internal surface, said external and internal surface defining an elastomeric cell wall therebetween of a given thickness, said cell wall enclosing a single hollow center of a given volume;
   b. placing a predetermined volume of said cells in a housing which is attached to said mold and in communication with said interior of said mold, said predetermined volume being of sufficient amount to cause said cells in said mold to have surface portions of said external cell wall surfaces, engaged with external cell wall surface portions of adjacent cells in a state that has substantially all of the total external cell wall surface of all cells, in engagement with surrounding portions of external cell wall surfaces of said surrounding cells, when said cells in said housing are subsequently combined with said cells in said mold;

c. said predetermined volume of said cells in said housing are moved from said housing into said interior of said mold to combine said cells in said housing with said cells in said mold and effectuate said cell engagement in said mold;

d. said multiplicity of preconstructed cells are permanently bonded together at said engaged external surface portions while in said engaged state while in said mold to collectively create said composite-foam tire filling;

e. upon completion of said bonding and the subsequent removal of said composite-foam tire filling from said mold, said cells comprising said composite-foam tire filling remain in said bonded together and said engaged state to provide said completed composite-foam tire filling;

f. said completed composite-foam tire filling is installed in the interior of a tire to provide said composite-foam filled tire.

2. The method of claim 1 wherein said multiplicity of individually preconstructed independent elastomeric cells have an independent, one-piece external surface and an independent, one-piece internal surface, defining a complete, one-piece, seamless, independent cell wall therebetween of a given thickness, completely enclosing a single hollow center of a given volume.

3. The method of claim 1 wherein said multiplicity of individually preconstructed independent elastomeric hollow cells contain a gas within said hollow center under pressure above that of atmospheric.

4. The method of claim 1 wherein said multiplicity of individually preconstructed independent elastomeric cells are coated with a resin that will act as matrix to bond said cells together, prior to or during said cells being filled or placed in said mold and said housing.

5. The method of claim 1 wherein said elastomeric material from which said cell walls are composed is produced from a multiple component polyurethane system which when said components are combined and cured, produce an elastomeric solid material having a tensile strength ranging from approximately two thousand (2,000) pounds per square inch (psi), to approximately eight thousand (8,000) pounds per square inch (psi).

6. The method of claim 1 wherein said composite-foam tire filling is composed of two different cell size sections, with the section of larger cells located toward the center of said composite-foam tire filling, and the section of smaller cells located toward the perimeter of said composite-foam tire filling.

7. The method of claim 1 wherein said tire filling includes an inner tube or chamber to contain pressurized gas.

8. The method of claim 1 wherein the external surface of said completed composite-foam tire filling is coated or impregnated with a gas impermeable barrier to prevent or reduce the migration of gas.

9. The method of claim 1 wherein said elastomeric material from which said cells are composed is reinforced with flexible fibers.

* * * * *